United States Patent
Keskar et al.

[11] Patent Number: 6,010,614
[45] Date of Patent: Jan. 4, 2000

[54] TEMPERATURE CONTROL IN A CERAMIC MEMBRANE REACTOR

[75] Inventors: Nitin Ramesh Keskar, Grand Island; Ravi Prasad, East Amherst; Christian Friedrich Gottzmann, Clarence, all of N.Y.

[73] Assignee: Praxair Technology, Inc., Danbury, Conn.

[21] Appl. No.: 09/089,512

[22] Filed: Jun. 3, 1998

[51] Int. Cl.$^7$ ................................. B01D 17/06
[52] U.S. Cl. .................... 205/765; 205/763; 95/45; 95/54; 95/288; 95/289; 429/17; 429/20; 429/26; 429/30; 429/34; 518/702; 518/703; 518/704; 518/705
[58] Field of Search ................... 95/54, 45, 288, 95/289; 205/763, 765; 429/17, 20, 26, 30, 34; 518/702, 703, 704, 705

[56] References Cited

U.S. PATENT DOCUMENTS

| | | | |
|---|---|---|---|
| 4,787,919 | 11/1988 | Campbell et al. | 55/16 |
| 4,791,079 | 12/1988 | Hazbun | 502/4 |
| 5,143,800 | 9/1992 | George et al. | 429/20 |
| 5,306,411 | 4/1994 | Mazanec et al. | 204/265 |
| 5,425,801 | 6/1995 | Prasad | 95/15 |
| 5,702,999 | 12/1997 | Mazanec et al. | 501/152 |
| 5,712,220 | 1/1998 | Carolan et al. | 502/400 |
| 5,723,074 | 3/1998 | Balachandran et al. | 429/33 |
| 5,733,435 | 3/1998 | Prasad et al. | 205/765 |
| 5,820,654 | 10/1998 | Gottzmann et al. | 95/54 |
| 5,820,655 | 10/1998 | Gottzmann et al. | 95/54 |
| 5,837,034 | 11/1998 | Keskar et al. | 95/54 |
| 5,837,125 | 11/1998 | Prasad et al. | 205/763 |
| 5,865,878 | 2/1999 | Drnevich et al. | 95/54 |

OTHER PUBLICATIONS

Balachandran et al., "Dense Ceramic Membranes for Converting Methane to Syngas", Manuscript of the Proceedings of the First International Conference on Ceramic Membranes (1995) No month available.

Nozaki et al., "Oxide Ion Transport for Selective Oxidative Coupling of Methane with New Membrane Reactor", AIChE Journal, pp. 870–877, vol. 40 (1994) No month available.

Nagamoto et al., "Methane Oxidation by Oxygen Transported through Solid Electrolyte", Journal of Catalysis, pp. 671–673 (1990) No month available.

*Primary Examiner*—Bruce F. Bell
*Attorney, Agent, or Firm*—Bharat C. Gandhi

[57] ABSTRACT

A method for maintaining the temperature of an oxygen-selective ion transport membrane within a desired temperature range includes providing an ion transport reactor with the oxygen-selective ion transport membrane. An oxygen-donating feed gas is delivered to a cathode side at a first temperature, at a first rate, and at a first oxygen partial pressure and a reactant gas is supplied to an anode side at a second temperature and a second rate. A physical condition is then established within the ion transport reactor that favors the transport of elemental oxygen through the oxygen selective ion transport membrane as oxygen ions. One or more process variables are then regulated to maintain the temperature of the oxygen selective ion transport membrane within the desired range.

15 Claims, 2 Drawing Sheets

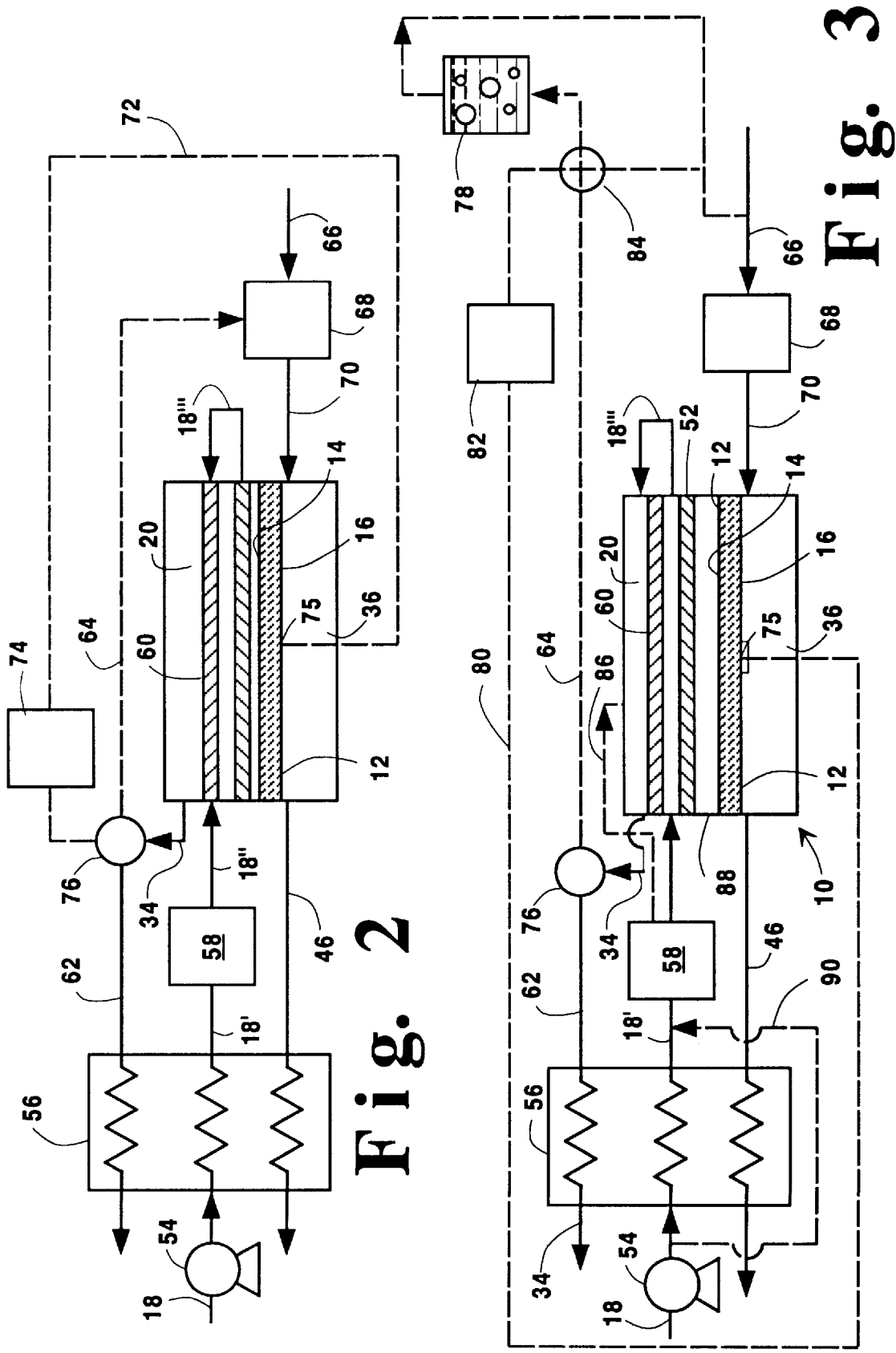

TEMPERATURE CONTROL IN A CERAMIC MEMBRANE REACTOR

GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to a process for managing the temperature within a solid electrolyte ionic conductor membrane reactor. More particularly, the temperature of the reactor membrane is maintained within a desired temperature range, preferably by control of either the input temperature of a fluid medium or the flow rate of that fluid medium, or a combination thereof.

BACKGROUND OF THE INVENTION

Oil and petrochemical companies have discovered vast quantities of natural gas in remote locations such as in polar regions and under seas. Transport of natural gas, which consists mostly of methane, is difficult and methane cannot be presently economically converted into more valuable products, such as hydrogen, or into products that are more economically contained or transported, such as liquid fuels, including methanol, formaldehyde and olefins. Typically, the methane is converted to synthesis gas (syngas), which is an intermediate in the conversion of methane to liquid fuels. Syngas is a mixture of hydrogen and carbon monoxide with a $H_2/CO$ molar ratio of from about 0.6 to about 6. There are many different methods known to convert methane to syngas. These methods include a methane steam reforming process, a carbon dioxide reforming process and the direct partial oxidation of methane.

The direct partial oxidation of methane in accordance with the equation:

$$CH_4 + \tfrac{1}{2}O_2 \rightarrow CO + 2H_2 \qquad (1)$$

can utilize an ionic conducting membrane reactor or a mixed conducting membrane reactor. In an ionic or mixed conducting membrane reactor, a solid electrolyte membrane that can conduct oxygen ions with infinite selectivity is disposed between an oxygen-containing feed stream and an oxygen-consuming, typically methane-containing, product or purge stream. "Oxygen selectivity" means that the oxygen ions are preferentially transported across the membrane over other elements, and ions thereof. The solid electrolyte membrane is made from inorganic oxides, typified by calcium- or yttrium-stabilized zirconium or analogous oxides having a fluorite or perovskite structure. Such membranes may also be used in gas purification applications as described in European Patent Application Publication Number 778,069 entitled "Reactive Purge for Solid Electrolyte Membrane Gas Separation" by Prasad et al.

At elevated temperatures, generally in excess of 400° C., the solid electrolyte membranes contain mobile oxygen-ion vacancies that provide conduction sites for the selective transport of oxygen ions through the material. The transport through the membrane is driven by the ratio of partial pressure of oxygen ($P_{O_2}$) across the membrane: $O^-$ ions flow from the side with high $P_{O_2}$ to that with low $P_{O_2}$.

Ionization of $O_2$ to $O^-$ takes place on the cathode side of the membrane and the ions are then transported across the solid electrolyte membrane. The $O^-$ ions are deionized on the anode side to form oxygen atoms which then combine to form $O_2$ molecules. For materials that exhibit only ionic conductivity, external electrodes are placed on the surfaces of the electrolyte and the electronic current is carried in an external circuit (electrically-driven mode). In mixed conducting materials, electrons are transported to the cathode side internally, thus completing a circuit and obviating the need for external electrodes (pressure-driven mode). Mixed conductors can also be used in the electrically driven mode.

U.S. Pat. No. 4,793,904 to Mazanec et al., that is incorporated by reference in its entirety herein, discloses an ion transport membrane coated on both sides with an electrically conductive layer. An oxygen containing gas contacts one side of the membrane. Oxygen ions are transported through the membrane to the other side, where oxygen reacts with methane or similar hydrocarbons to form syngas. The electrons released by the oxygen ions flow from the conductive layer to external wires and may be utilized to generate electricity.

A mixed conductor-type ceramic membrane has the ability to selectivity transport both oxygen ions and electrons. With this type membrane, it is not necessary to provide an external electric field for removal of the electrons released by the oxygen ions. U.S. Pat. No. 5,306,411 by Mazanec et al., that is incorporated by reference in its entirety herein, discloses applications of a mixed conductor membrane. The membrane has two solid phases in a perovskite crystalline structure: a phase for oxygen ion transport and a second phase for electron conduction. The oxygen ion transport is disclosed as being useful to form syngas and to remediate flue gases such as $NO_X$ and $SO_X$.

When the ion transport reactor is operated in a pressure driven mode, an anode side reactive purge, in the form of an oxygen scavenging gas, may be introduced to enhance operation of the reactor. The oxygen scavenging gas, such as natural gas, $CH_4$, methanol, ethanol, hydrogen, or carbon monoxide, reduces the $P_{O_2}$ on the anode side and enhances the pressure driven $O_2$ transport through the electrolyte.

A major advantage of using a reactive purge is that it causes a dramatic reduction in the membrane area requirement for a given oxygen removal process because the partial oxygen pressure on the anode is decreased and the transport driving force is increased. However, the energy released by the anode side oxidation reactions can lead to significant exotherms, that is, high temperature rises, in the reactor. If the exotherms are not properly controlled, then the temperature increase that results could damage the ion transport membrane and other reactor components.

If the exotherm is not controlled, the ceramic ion transport membrane may overheat and degrade chemically and mechanically. Further, if portions of the ceramic ion transport membrane heat more than other portions of the membrane, mechanical stresses caused by thermal expansion may also damage the membrane. Still further, the elevated temperatures may damage other reactor components, such as metal to ceramic seals and joints.

Temperature control of a gas separation system is disclosed in U.S. Pat. No. 4,787,919 to Campbell et al., that is incorporated by reference in its entirety herein. Campbell et al. disclose a gas separation system utilizing a polymeric membrane and recite the use of maintaining superheat conditions for the feed gas to avoid condensation of feed gas constituents on the membrane surface. The heat of compression of the feed gas is beneficially used to maintain superheat conditions in a thermally insulated chamber that encompasses the entire reactor. However, in this gas separation system, there are no exothermic chemical reactions analogous to those taking place in a ceramic membrane reactor.

Therefore, there remains a need for a process to maintain the temperature of a ceramic ion transport membrane within a desired temperature range by control of temperature at the membrane level, as opposed to the reactor level, to eliminate the problems inherent in the prior art.

OBJECTS OF THE INVENTION

It is therefore an object of the invention to provide a process for maintaining the temperature of a ceramic ion transport membrane within a desired range.

It is a further object of the invention to regulate membrane temperature by control of the temperature of fluid media introduced to at least one side of the ceramic membrane. Such fluid media may include, without limitation, reactive gases, feed gases containing oxygen, non-reactive carrier or sweep gases and atomized liquids.

Yet another object of the invention is to employ the heat removed from the anode side of the reactor for a useful purpose, such as to preheat feed gases introduced to the cathode side of the reactor.

A still further object of the invention is to utilize a feedback loop whereby the temperature of the ceramic ion transport membrane is continuously regulated.

SUMMARY OF THE INVENTION

In one aspect, this invention comprises a process for maintaining the temperature of an oxygen selective ion transport membrane, contained within an ion transport reactor, within a desired temperature range. The ion transport reactor is provided with the oxygen selective ion transport membrane that has both a cathode side and an anode side. An oxygen donating feed gas is delivered to the cathode side with the feed gas being at a first temperature, at a first rate, and at a first oxygen partial pressure. A gas capable of reacting with oxygen is supplied to the anode side at a second temperature and at a second rate. A condition is established within the ion transport reactor that furthers transport of oxygen through the oxygen selective membrane, and the elemental oxygen obtained from the first feed stream is transported in ionic form through the membrane to the anode side. One or more process variables are regulated according to the invention to maintain the temperature of the membrane within the desired temperature range.

In a preferred embodiment of the invention, the exothermic heat generated by the anode side reaction is balanced by inducing within the reactor at least one of (1) the latent heat of vaporization of an injected liquid stream, (2) an endothermic reaction, or (3) a temperature rise of at least one fluid stream. In some embodiments, one or more of the feed gas temperature, the feed gas flow rate, the feed gas chemical composition, the reactant gas temperature, the reactant gas flow rate and the reactant gas composition is then regulated to maintain the temperature of the oxygen selective ion transport membrane within the desired temperature range.

In still another preferred embodiment of the invention, the temperature of the oxygen selective ion transport membrane is continuously monitored or estimated. This temperature is communicated to a controller that effects an adjusting step to change a process variable. Adjustable variables include, without limitation, gas temperature, gas flow rate, gas composition, and introduction of a cooling medium.

BRIEF DESCRIPTION OF THE DRAWINGS

Other objects, features and advantages will occur to those skilled in the art from the following description of preferred embodiments and accompanying drawings, in which:

FIG. 2 is a process flow diagram illustrating a method for regulating the temperature of a ceramic ion transport membrane;

FIG. 3 a process flow diagram illustrating another method for regulating the temperature of an ion transport membrane;

DETAILED DESCRIPTION OF THE INVENTION

This invention may be accomplished by providing an ion transport reactor that contains an oxygen-selective ion transport membrane having a cathode side which receives a feed gas containing elemental oxygen and an anode side which receives a gas capable of chemically reacting with oxygen. The temperature of the ceramic ion transport membrane is maintained within a desired temperature range by regulating one or more of the input temperature or input flow rate of a fluid medium introduced to either the anode side or the cathode side of the reactor, the chemical composition of the fluid medium, and/or introduction of a cooling medium into the reactor.

Figure 1:
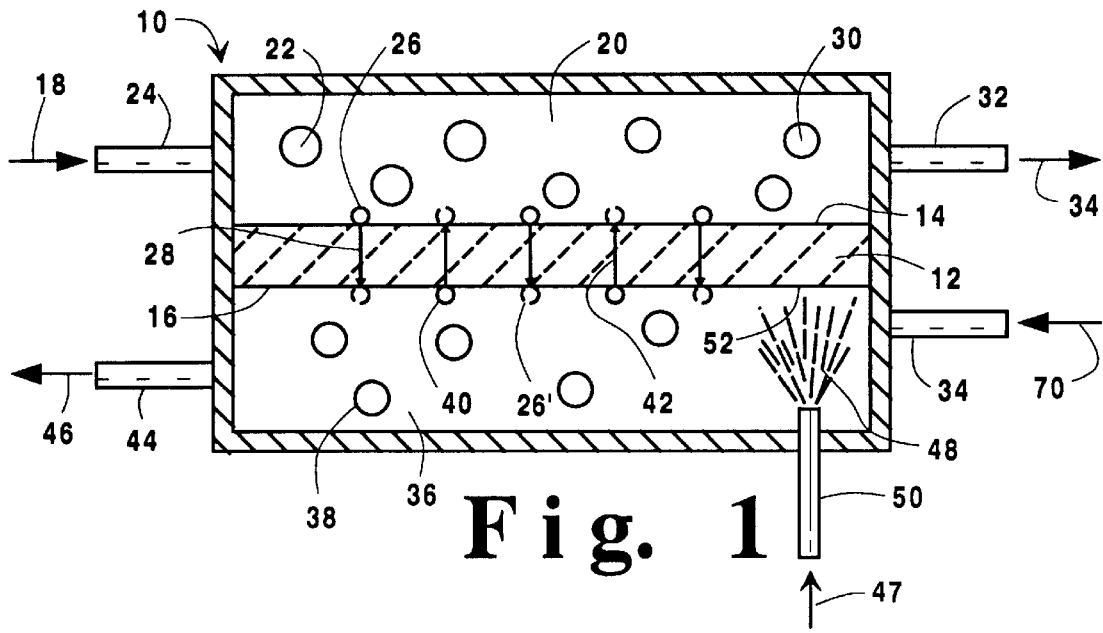
FIG. 1 illustrates in cross-sectional representation a mixed conductor ion transport membrane operated in accordance with the invention.

FIG. 1 illustrates in cross-sectional representation an ion transport reactor 10 for operation according to the process of the invention. While the ion transport reactor 10 illustrated in FIG. 1 is of the mixed conductor type, an ionic conducting membrane reactor could be utilized without significantly affecting the process of the invention. However, ionic-only conducting membranes require an electrical circuit to return electrons from the anode side to the cathode side of the membrane. Membranes operating on a partial pressure gradient are preferred because no external driving force is required to drive the oxygen separation.

Disposed within the ion transport reactor 10 is an oxygen selective ion transport membrane 12. The oxygen selective ion transport membrane 12 has a cathode side 14 and an anode side 16.

The oxygen-selective ion transport membrane 12 is formed as either a dense wall solid oxide mixed or dual phase conductor, or alternatively, as a thin film solid oxide mixed or dual phase conductor that is supported on a porous substrate. The oxygen-selective ion transport membrane 12 has a nominal thickness of under 5000 microns and is preferably less than 1000 microns thick.

The ion transport material has the ability to transport oxygen ions and electrons at the prevailing oxygen partial pressure in the temperature range of from about 450° C. to about 1200° C. when a chemical potential difference is maintained across the ion transport membrane surface. This chemical potential difference preferably is achieved by reacting transported oxygen with an oxygen-consuming reactant gas. The oxygen ion conductivity of the membrane is typically in the range of between 0.01 and 100 S/cm where S is reciprocal ohms (1/Ω). Suitable materials for the ion transport membrane include perovskites and dual phase metal-metal oxide combinations as listed in Table 1. Since the reactive environment on the anode side 16 of the oxygen selective ion transport membrane 12, in many applications, creates very low partial oxygen pressures, the chromium-containing perovskites of Table 1 and as disclosed in U.S. Pat. Nos. 5,702,999 (Mazanec et al.), 5,712,220 (Carolan et al.) and/or 5,733,435 (Prasad et al.) may be the preferred material since these tend to be stable in the low partial oxygen pressure environment. The chromium-containing perovskites are not typically decomposed at very low partial oxygen pressures.

Optionally, a porous catalyst layer, possibly made from the same perovskite material, may be added to one or both sides of the oxygen transport membrane to enhance oxygen surface exchange and the chemical reactions on the surfaces. Alternatively, the surface layers of the oxygen-selective ion transport membrane may be doped, for example, with cobalt, to enhance surface exchange kinetics.

TABLE 1

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq y \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\delta}$ ($0 \leq \beta \leq 1$, $\beta$ from stoichimetry)
4. $La_{0.2}Ba_{0.3}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x", y, y', y" all in 0–1 range)
   where: A, A', A" = from groups 1, 2, 3 and f-block lanthanides
   B, B', B" = from d-block transition metals
6. (a) Co-La-Bi type: Cobalt oxide 15–75 mole %
   Lanthanum oxide 13–45 mole %
   Bismuth oxide 17–50 mole %
   (b) Co-Sr-Ce type: Cobalt oxide 15–40 mole %
   Strontium oxide 40–55 mole %
   Cerium oxide 15–40 mole %
   (c) Co-Sr-Bi type: Cobalt oxide 10–40 mole %
   Strontium oxide 5–50 mole %
   Bismuth oxide 35–70 mole %
   (d) Co-La-Ce type: Cobalt oxide 10–40 mole %
   Lanthanum oxide 10–40 mole %
   Cerium oxide 30–70 mole %
   (e) Co-La-Sr-Bi type: Cobalt oxide 15–70 mole %
   Lanthanum oxide 1–40 mole %
   Strontium oxide 1–40 mole %
   Bismuth oxide 25–50 mole %
   (f) Co-La-Sr-Ce type: Cobalt oxide 10–40 mole %
   Lanthanum oxide 1–35 mole %
   Strontium oxide 1–35 mole %
   Cerium oxide 0–70 mole %
7. $Bi_{2-x-y}M'_xM_yO_{3-\delta}$ ($0 \leq x \leq 1$, $0 \leq y \leq 1$, $\delta$ from stoichimetry)
   where: M' = Er, Y, Tm, Yb, Th, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;

TABLE 1-continued

Material composition v equals from zero to about 1;
w equals from zero to about 1;
x equals a number that satisfies the
valences of the A, A', B, B', B" in
the formula; and 0.9 <
$(s + t)/(u + v + w) < 1.1$ 10. One of the materials of $La_{1-x}Sr_xCu_{1-y}M_yO_{3-\delta}$
    family, where:
    M represents Fe or Co;
    x equals from zero to about 1;
    y equals from zero to about 1;
    δ equals a number that satisfies the
    valences of La, Sr, Cu, and M in the
    formula.
11. One of the materials of $Ce_{1-x}A_xO_{2-\delta}$ family,
    where:
    A represents a lanthanide, Ru, or Y;
    or a mixture thereof;
    x equals from zero to about 1;
    δ equals a number that satisfies the
    valences of Ce and A in the formula.
12. One of the materials of $Sr_{1-x}Bi_xFeO_{3-\delta}$
    family, where:
    x equals from zero to about 1;
    δ equals a number that satisfies the
    valences of Sr, Bi and Fe in the
    formula
13. One of the materials of $Sr_xFe_yCo_zO_w$
    family, where:
    x equals from zero to about 1;
    y equals from zero to about 1;
    z equals from zero to about 1;
    w equals a number that satisfies the
    valences of Sr, Fe and Co in the
    formula.
14. Dual phase mixed conductors (electronic/ionic):
    $(Pd)_{0.5}/(YSZ)_{0.5}$
    $(Pt)_{0.5}/(YSZ)_{0.5}$
    $(B\text{-}MgLaCrO_x)_{0.5}(YSZ)_{0.5}$
    $(In_{90\%}Pt_{10\%})_{0.5}/(YSZ)_{0.5}$
    $(In_{90\%}Pt_{10\%})_{0.5}/(YSZ)_{0.5}$
    $(In_{90\%}Pr_{2.5\%}Zr_{2.5\%})/(YSZ)_{0.5}$
    Any of the materials described in 1–13, to which a high temperature
    metallic phase (e.g., Pd, Pt, Ag, Au, Ti, Ta, W) is added.

The ion transport reactor 10 is operated at an elevated temperature that is sufficient to facilitate oxygen ion transport through the oxygen-selective ion transport membrane 12. The operating temperature is at least 400° C., and preferably in the range of from about 400° C. to about 1200° C. and most preferably, in the range of from about 500° C. to about 1000° C.

An oxygen-donating first feed stream, referred to as feed gas 18, is delivered to a first chamber 20 that is in contact with the cathode side 14 of the oxygen selective ion transport membrane 12. The feed gas 18 may be any gaseous composition that contains oxygen. This includes compositions such as steam that are gaseous at the operating temperature of the ion transport reactor, even if in a different state at lower temperatures. Exemplary compositions for the feed gas 18 include air, water vapor, carbon dioxide, $NO_x$, and combinations thereof.

Oxygen-containing molecules 22 contained within the feed gas 18 enter the ion transport reactor 10 through cathode side inlet 24. Elemental oxygen 26 is dissociated from the oxygen-containing molecules 22 at the cathode side 14 of the oxygen-selective ion transport membrane 12.

Oxygen ions ($O^-$), are transported, shown by arrows 28, through the oxygen-selective ion transport membrane 12 to the anode side 16. Oxygen-depleted gas 30 exits the ion transport reactor 10 through the cathode side outlet 32. A first product stream 34, also referred to as the retentate, contains those constituents retained on the cathode side 14 of the oxygen-selective ion transport membrane 12.

"Elemental oxygen" refers to oxygen that is uncombined with other elements of the periodic table. While typically in diatomic form, the term "elemental oxygen" as used herein is intended to encompass single oxygen atoms, triatomic ozone, and other forms uncombined with other elements.

Oxygen 26 in the form of ions ($O^-$) is transported, by means of lattice vacancies, through the oxygen selective ion transport membrane 12 to a second reaction chamber 36 in contact with the anode side 16. Once in the second reaction chamber 36, oxygen 26' is available to react with oxygen-consuming molecules 38 within the second reaction chamber 36 as introduced through conduit 39 as part of purge stream 70. During oxidation reactions, the oxygen ions 30' surrender electrons 40 that are then transported, arrows 42, through the oxygen-selective ion transport membrane 12 and available on the cathode side 14 to combine with elemental oxygen 26 to form oxygen ions. The products resulting from the combination of the oxygen consuming molecules 38 and elemental oxygen 26' exit the second reaction chamber 36 through an anode side outlet 44 as a second product stream 46. The second product stream 46 is also referred to as the permeate, referring to constituents that include, or are derived from, the oxygen that was transported through the oxygen selective ion transport membrane 12.

While FIG. 1 illustrates the feed gas 18 and first product stream 34 flowing in a direction counter to the second product stream 46, cocurrent flow may be applicable under certain applications.

The flux, or rate of oxygen ion transport through the oxygen-selective ion transport membrane 12 per unit area of the membrane, is driven by the ratio of oxygen partial pressures ($P_{O2}$) of the constituents of the first chamber 20 (first $P_{O2}$) and the constituents of the second, reaction chamber 36 (second $P_{O2}$). It is desirable to maximize the oxygen flux to reduce the membrane area requirement. Preferably, while the total pressures within both the first chamber 20 and the second reaction chamber 36 are both between 1 and 100 atmospheres, the ratio of the first $P_{O2}$ to the second $P_{O2}$ is at least a factor of $10^1$ and more preferably, at least $10^5$. For example, the first $P_{O2}$ may be on the order of one atmosphere and the second $P_{O2}$ on the order of 10–6 atmosphere or less.

The anode side 16 oxidation reaction between the oxygen-consuming molecules 38 and elemental oxygen 26' is exothermic. It is necessary to dissipate this excess heat to limit membrane temperature excursions and maintain the temperature of the oxygen-selective ion transport membrane 12 within a desired temperature range, preferably within 200° C. of a selected membrane temperature, more preferably within 100° C. of the selected temperature within the reaction section of the reactor.

In accordance with a first embodiment of the invention, a liquid 47 is introduced to the second reaction chamber 36 where it is atomized. The energy required to vaporize the atomized liquid, that is, the latent heat of vaporization, balances the exothermic heat of reaction and stabilizes the temperature at the cathode side 14 and the temperature of the oxygen-selective ion transport membrane 12. A preferred liquid for the liquid 47 to be atomized is water. Preferably, the water is deionized to avoid the deposition of minerals and salts on the walls of the ion transport reactor 10. These deposits may decrease the activity of the oxygen-selective ion transport membrane 12 or chemically react with it. The liquid 47 is introduced through conduit 50 into the second reaction chamber 36 and is preferably introduced in atomized form 48 at hot spots, such as the interface 52 of the oxygen-selective ion transport membrane 12 and walls of ion transport reactor 10 where any non-hermeticity at the interface may allow for the ingress of oxygen and cause a localized hot spot. Alternatively, as described hereinbelow, the atomized liquid is added to a gaseous medium that is delivered to the second reaction chamber 36.

Another process to control the temperature of the oxygen-selective ion transport membrane is schematically depicted in FIG. 2. Feed gas 18 is compressed, such as by a blower or compressor 54, and then delivered to a heat exchanger 56. Heat exchanger 56 transfers heat from the exothermic reactants of the second product stream 46 and first product stream 62 to elevate the temperature of the oxygen-donating first feed stream to between about 400° C. and 500° C. Preheated feed gas 18' optionally is further heated by heating unit 58 to a hot feed temperature of between about 500° C. and 700° C. The hot feed gas 18" is then delivered to the first chamber 20. In general, the temperature of one or more fluid streams may be increased from 100° C. to 700° C. to stabilize the membrane temperature.

Preferably, hot feed gas 18" does not contact the cathode side 14 of the oxygen-selective ion transport membrane 12, but rather is isolated therefrom by a closed conduit 60. The closed conduit 60 is formed from any thermally conductive material such as Incoloy (a high strength, corrosion resistant alloy of iron, nickel and cobalt). The closed conduit is disposed proximate to the oxygen-selective ion transport membrane 12 that is at a temperature between 400° C. and 1200° C. and spaced therefrom by a distance of from about 0.05 inch to about 1 inch. Radiant and convective heat transferred from the oxygen-selective ion transport membrane further increases the temperature of the oxygen-donating first feed stream 18''' to a temperature of between about 700° and 1000° C.

The feed gas 18''' is delivered to the first reaction chamber 20 and contacts the cathode side 14 of the oxygen-selective ion transport membrane. The feed stream loses oxygen and an oxygen-lean first product stream 34 exits the first reactive chamber. Control of the temperature of the feed gas 16 delivered to the inlet of the first chamber 20 is one means to control the temperature of the oxygen selective ion transport membrane 12.

The first product stream 34 is at a temperature of between about 600° C. and 1000° C., and a first portion 62 is returned to the heat exchanger 56. A second portion 64, the reflux portion, is mixed with a fuel gas 66. The term "fuel gas" is intended to encompass reactive gases, such as natural gas or methane, oxygen-accepting purge gases, that may be any oxygen-accepting or oxygen-consuming gas, including the product-of-reaction gases, typically hydrogen and carbon monoxide. A further component of the fuel gas may be a non-reactive diluent gas such as nitrogen, steam or carbon dioxide.

The reflux portion 64 of the first product stream 34 is at a temperature of about 700° C. to about 1000° C. and the mixture of the fuel gas 66 and the reflux portion 64 achieves an elevated temperature. The mixture may be further heated by an optional heating unit 68. The heated mixture 70 that is typically at a temperature of between about 700° C. and 1000° C. is delivered to the second reaction chamber 36. Another means to control the temperature of the oxygen selective ion transport membrane 12 is by control of the temperature of the purge stream or of the heated mixture delivered to the inlet of the second reaction chamber 36.

An exothermic oxidation reaction takes place in the second reaction chamber and the elevated temperature second product stream 46 that may be an exhaust gas or product, for example syngas components, is delivered to heat exchanger 56 to transfer heat to the oxygen donating first feed stream 18.

Without control according to the present invention, the membrane may experience a significant temperature rise, e.g. more than 200° C., due to the exothermic chemical reaction. To prevent damage to the oxygen selective ion transport membrane 12, the temperature on the anode side is maintained within the desired temperature range. A first way to maintain the temperature is to introduce an atomized liquid as described above either into the second reaction chamber 36 or into the fuel gas 66 stream or the purge stream 70. Alternatively, the purge stream 70 may be bubbled through a water bath.

Another embodiment of the invention achieves temperature control by adjusting the chemical composition of the feed gas, the fuel gas, or the amount of reflux portion 64 added to the purge stream 70. Still another means of temperature control is to adjust the flow rate of the constituents delivered to the reactor to control the relative volume of these constituents in the reactor.

A feedback loop 72 is preferably utilized. The feedback loop 72 monitors the temperature of the oxygen-selective ion transport membrane 12 and provides the temperature information to a controller 74. Typically, the feedback loop 72 includes a temperature sensor 75, such as a thermocouple, in thermal contract with the oxygen selective ion transport membrane. The temperature sensor 75 communicates with controller 74. Controller 74 then adjusts one or more of the above specified process variables (feed gas temperature, feed gas flow rate, feed gas composition, purge gas temperature, purge gas flow rate and purge gas chemical composition) to regulate the oxygen selective ion transport membrane 20 temperature. For example, controller 74 may regulate valve 76, which preferably is adjustable and is capable of withstanding the high operating temperatures of the reactor. Valve 76 determines the reflux ratio: (the flow rate of the reflux portion 64)/(the flow rate of the first portion 62)×100%. Typically, this ratio varies between zero percent and 25%. Without external cooling, the maximum ratio is typically in the range of 15–20% and more preferably, the maximum ratio is in the range of from about 8% to about 10%. When steam is added to the fuel gas 66, even lower ratios are utilized because the steam provides cooling without reducing the purge flow rate.

Utilizing steam in the purge stream will reduce or altogether eliminate the possibility of coke formation occurring in the ion transport reactor 10 as disclosed in copending U.S. patent application Ser. No. 08/880,878 entitled "Process for Reducing Carbon Production in Solid Electrolyte Ionic Conductor Systems" by Keskar et al., filed Jun. 23, 1997, now U.S. Pat. No. 5,837,034, that is incorporated by reference in its entirety herein. Reactive purge arrangements including the use of steam and product purge are disclosed in "Reactive Purge for Solid Electrolyte Membrane Gas Separation", U.S. Ser. No. 08/567,699, filed Dec. 5, 1995, E.P. Publ. No. 778,069, now U.S. Pat. No. 5,837,125, which is incorporated herein by reference. Preferred configurations for ion transport modules utilizing a reactive purge are disclosed in "Solid Electrolyte Ionic Conductor Reactor Design", U.S. Ser. No. 08/848,204, filed Apr. 29, 1997 now U.S. Pat. No. 5,820,655, and also incorporated herein by reference. All three applications are commonly owned with the present application.

The process configuration schematically illustrated in FIG. 3 illustrates a technique to control membrane temperature as well as introduce steam to a purge stream. A number of the structures illustrated in FIG. 3 have been previously described and that description is incorporated into FIG. 3. The reflux portion 64 is directed to a cooler 78 that may be any apparatus effective to reduce the temperature of the reflux portion 64. One exemplary cooling apparatus is a simple water bath through which the reflux portion 64 gas stream is sparged to lower its temperature by evaporative cooling. A feedback loop 80 communicates the temperature of the oxygen selective ion transport membrane 12 to a controller 82 that regulates the portion of the reflux portion 64 directed to cooler 78 prior to mixing with fuel gas 66 and the portion delivered to fuel gas 66 without prior evaporative cooling. By controlling the fraction of the purge stream that is cooled, the purge inlet temperature can be effectively controlled. An advantage of this idea is that since that only water vapor is added to the purge stream, ordinary water can be used for cooling without the possibility of depositing salts and minerals from the water in the reactor 10. In another embodiment, the temperature of feed stream 18' is controlled by selectively passing some or all of feed stream 18 through by-pass conduit 90, shown in phantom.

It is also advantageous to monitor the temperature of the feed gas and to provide that information by feedback loop 86 to heating unit 58. The temperature of the feed gas 18''' is controlled in a straight-forward manner by controlling the heat input of the heating unit 58. The advantages of controlling the temperature of the feed gas 18''' include the following:

(1) Lowering the feed temperature will reduce the maximum temperature in the ion transport reactor 10, particularly the temperature of the oxygen-selective ion transport membrane 12. The reduced temperature increases the strength and stability of the components of the ion transport reactor, in particular the oxygen-ion transport membrane.

(2) The lower feed temperature is beneficial in lowering the temperature at the seals at the feed end interface 88 and possibly at the purge end interface 52 as well. The lower temperature is beneficial because material constraints, such as metal to ceramic seals and joints, will likely dictate that the seals be operated below some maximum continuous use temperature. A low temperature feed offers the opportunity to use the feed as a cooling stream to lower the temperature of the seals.

(3) The lower feed temperature will increase the mean temperature differential, $\Delta T$, between the first reaction chamber 20 and the second reaction chamber 36. Increasing $\Delta T$ increases the heat transfer from the second reaction chamber 36 to the first reaction chamber 20 and assists in controlling the maximum temperature of the second reaction chamber 36. Care must be taken to ensure that heat transfer at the inlet is not so high that it quenches the oxygen transport capability of the membrane.

(4) By lowering the feed temperature, the temperature difference between the second product stream 46 and the first portion 62 containing the first product stream 34 is increased. This increases the $\Delta T$ between the heating and cooling streams in the heat exchanger 56. The increased $\Delta T$ will result in increased heat transfer in the heat exchanger 56 and reduce the heat exchanger size requirements.

(5) By introducing the feed streams to the ion transport reactor 10 at a high temperature, it may be possible to eliminate the heating unit 58 in feed stream 18, resulting in a system simplification and potential cost reduction.

One technique to obtain high feed stream temperature is to preheat the feed stream counter-currently to the departing anode side or permeate steam within the reactor. This technique may be combined with balancing heat of reaction by transferring heat to the cathode side streams to maintain the membrane in the reactor section or region within a desired temperature range.

The minimum feed temperature that can be used depends on many factors, including the effectiveness of heat transfer between the feed and purge streams in the ion transport reactor 10. It is possible to increase the heat transfer between the feed and purge streams by increasing the area of the oxygen-selective ion transport membrane 12, however, this approach is achieved at increased capital cost. The above disclosed designs of the reactor are such that they effect heat transfer from the product stream to the feed stream without a change in the area of the oxygen-selective ion transport membrane and there is a potential for significant reduction in feed temperature, and perhaps for the elimination of heating unit 58, leading to reactors design simplification and reduced cost.

The formation of syngas or its constituents CO and $H_2$ will be further benefitted by catalytic reforming of unreacted fuel gas 66 taking place outside the ion transport reactor, for example, in heating unit 68. Recirculation of the exhaust gases of partial steam reforming outside the reactor 10 both produces carbon monoxide and hydrogen and reduces the temperature of the recirculated exhaust gases. Methane steam reforming is an endothermic reaction:

$$CH_4 + H_2O \rightarrow CO + 3H_2. \quad (2)$$

The reforming of the unreacted fuel contributes hydrogen and carbon monoxide to the purge stream that assists in the purge side reactions.

The advantages of the invention will become more apparent from the examples that follow:

EXAMPLES

Calculations for the examples that follow were performed for an ion transport reactor in which heat generated by fuel combustion on the purge side is rejected to the feed side gas stream. Fundamental heat and mass balance equations were used for the simulations. For the "design case" methane was used as the fuel gas 66 within the purge stream 70. However, the invention is not limited to the use of methane as the fuel gas. In the present case, the oxygen transport across the oxygen-selective ion transport membrane 12 is assumed to be controlled by the rate of methane combustion on the purge side. The parameters for the design case are as follows:

TABLE 2

|  | FEED STREAM 18* | PURGE STREAM 70 |
|---|---|---|
| $O_2$ % | 2 | — |
| $CH_4$ % | — | 16.7 |
| T (° C.) | 950 | 950 |
| P (psig) | 150 | 148 |
| Flow (SCFH) | 500 | 100 |
| SELIC thickness (mm) | 1.3 | Same |
| SELIC area (ft²) | 2 | Same |

*Reference numerals refer to the FIGS.

For the two examples that follow, the following constraints were imposed on the reactor operation. The retenate stream 34 must contain one part per million, or less, of oxygen, the temperature of the oxygen-selective ion transport membrane 10 must not exceed 1050° C., and the average oxygen flux across the oxygen-selective ion membrane must be at least 2.5 sccm/cm² (sccm=(cm³ at 1 atmosphere and 0° C.)/cm²–minute).

Example 1

Figure 4:
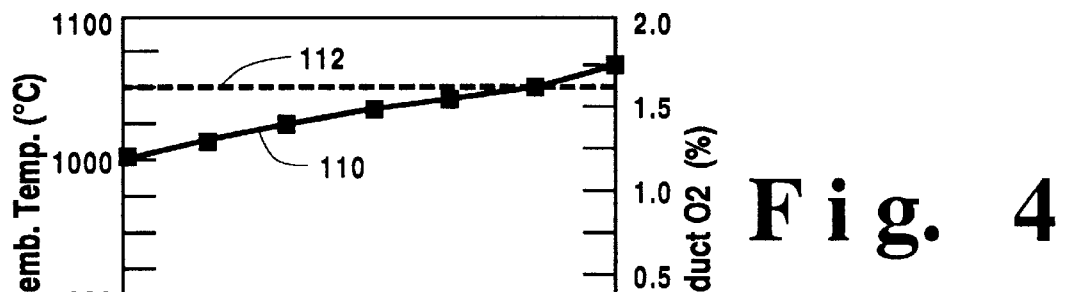
FIG. 4 graphically illustrates using feed temperature control to limit the maximum membrane temperature.

Control of the temperature of the feed gas is a means to limit the maximum temperature of the oxygen-selective ion transport membrane 12. For this example, all parameters except the feed temperature were the same as in the design case. The calculations result in the operating characteristics shown in FIG. 4. The maximum temperature of the oxygen-selective ion transport membrane increases, curve 110, with increasing feed temperature in the range of 800° C.–950° C. To keep the maximum oxygen-selective ion transport membrane temperature below 1050° C., doubled line 112, the feed temperature should remain below 910° C. For a feed temperature of between 800° C. and 950° C., no oxygen remains in the retenate stream 34, as shown by doubled line 114, thus all constraints listed in Table 1 are obeyed for a feed temperature range of 800° C.–910° C.

Example 2

Figure 5:
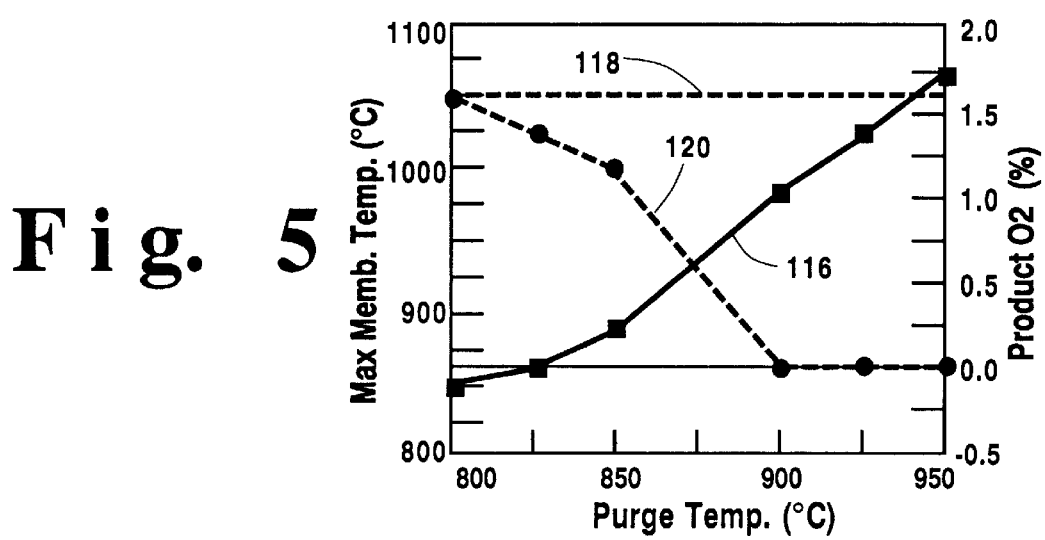
FIG. 5 graphically illustrates using purge temperature control to limit the maximum membrane temperature.

Temperature control of the purge gas is a means to limit the maximum temperature of the oxygen-selective ion transport membrane 12. In this case, all parameters are the same as in Table 1, except for the temperature of the purge gas. The calculations result in the operating characteristics shown in FIG. 5. The maximum temperature of the oxygen-selective ion transport membrane increases, curve 116, with increasing purge temperatures in the range of 800° C.–950° C. The percent by volume of oxygen in the retentate product stream is shown by doubled curve 120. When the temperature of the purge gas exceeds 900° C., no oxygen was found in the retenate stream 34. However, to keep the temperature of the oxygen-selective ion transport membrane 12 below 1050° C., doubled line 118, a purge temperature of less than 935° C. was required. Therefore, a permissible purge temperature range is from about 900° C. to about 935° C.

While a sensor has been particularly described as providing process variable information to the controller, process variable information may be provided by a computer simulator to calculate the membrane temperature thereby enabling the controller to provide necessary adjustment.

It is recognized that the ion transport membranes utilized in the process of the invention may have any desired configuration, including tubes, plates and monoliths with straight channels. In addition, flux rates may be enhanced through the incorporation of catalysts, surface coatings or porous layers with the membranes.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A method for maintaining the temperature of an oxygen-selective transport membrane, contained within an ion transport reactor, within a desired temperature range which comprises:
   a) providing the ion transport reactor with said oxygen selective ion transport membrane that has a cathode side and an anode side;
   b) delivering an oxygen-donating feed gas at a first temperature, at a first rate, and at a first oxygen partial pressure to said cathode side;
   c) supplying a reactant gas to the anode side at a second temperature and at a second rate, said reactant gas being capable of reacting with oxygen;
   d) establishing a physical condition within said ion transport reactor that favors transport of elemental oxygen through said ion transport membrane as oxygen ions;
   e) transporting elemental oxygen obtained from said feed gas through said ion transport membrane as oxygen ions to provide transported elemental oxygen to said anode side; and
   f) regulating one or more process variables to maintain said temperature of said ion transport membrane within said desired temperature range.

2. The method of claim 1 wherein regulating includes balancing exothermic heat generated by reaction on the anode side by inducing within the reactor at least one of: latent heat of vaporization of an injected liquid stream; an endothermic reaction; and a temperature rise in at least one fluid stream.

3. The method of claim 1 including determining the temperature of said oxygen selective ion transport membrane through direct measurement or through estimation based on at least one measured variable instead of direct measurement of the membrane temperature, and providing said determined temperature to a controller.

4. The method of claim 3 wherein said controller, responsive to said provided temperature, adjusts one or more of said feed gas temperature, said feed gas flow rate, said feed gas composition, said reactant gas temperature, said reactant gas flow rate and said reactant gas composition.

5. The method of claim 4 including the step of selecting said reactant gas to include at least one member of the group consisting of natural gas, methane, ethane, propane, butane, hydrogen, carbon monoxide, methanol and ethanol.

6. The method of claim 4 wherein said controller adjusts at least one of the temperature of said feed gas and the temperature of said reactant gas.

7. The method of claim 4 wherein said controller adjusts at least one of the flow rate at which said reactant gas is delivered to said anode side and the flow rate at which said feed gas is delivered to said cathode side.

8. The method of claim 4 wherein a cooling medium is delivered to said anode side to lower the reactant gas temperature at said anode side.

9. The method of claim 8 wherein said cooling medium is atomized water.

10. The method of claim 8 wherein said cooling medium is steam.

11. The method of claim 4 including the step of cooling said reactant gas prior to delivery to said cathode side.

12. The method of claim 11 wherein at least a portion of said reactant gas is bubbled through a water bath.

13. A method for maintaining the temperature of an oxygen-selective transport membrane, contained within an ion transport reactor, within a desired temperature range which comprises:

a) providing the ion transport reactor with said oxygen selective ion transport membrane that has a cathode side and an anode side;

b) delivering an oxygen-donating feed gas at a first temperature, at a first rate, and at a first oxygen partial pressure to said cathode side;

c) supplying a reactant gas to the anode side at a second temperature and at a second rate, said reactant gas being capable of reacting with oxygen;

d) establishing a physical condition within said ion transport reactor that favors transport of elemental oxygen through said ion transport membrane as oxygen ions;

e) transporting elemental oxygen obtained from said feed gas through said ion transport membrane as oxygen ions to provide transported elemental oxygen to said anode side;

f) regulating one or more process variables to maintain said temperature of said ion transport membrane within said desired temperature range;

g) determining the temperature of said oxygen selective ion transport membrane through estimation based on at least one measured variable instead of direct measurement of the membrane temperature, and providing said determined temperature to a controller;

h) said controller, responsive to said provided temperature, adjusting one or more of said feed gas temperature, said feed gas flow rate, said feed gas composition, said reactant gas temperature, said reactant gas flow rate and said reactant gas composition; and i) selecting said reactant gas to include at least one member of the group consisting of natural gas, methane, ethane, propane, butane, hydrogen, carbon monoxide, methanol and ethanol.

14. The method of claim 13 wherein said cooling medium is atomized water.

15. A method for maintaining the temperature of an oxygen-selective transport membrane, contained within an ion transport reactor, within a desired temperature range which comprises the steps of:

a) providing the ion transport reactor with said oxygen selective ion transport membrane that has a cathode side and an anode side;

b) delivering an oxygen-donating feed gas at a first temperature, at a first rate, and at a first oxygen partial pressure to said cathode side;

c) supplying a reactant gas to the anode side at a second temperature and at a second rate, said reactant gas being capable of reacting with oxygen;

d) establishing a physical condition within said ion transport reactor that favors transport of elemental oxygen through said ion transport membrane as oxygen ions;

e) transporting elemental oxygen obtained from said feed gas through said ion transport membrane as oxygen ions to provide transported elemental oxygen to said anode side;

f) regulating one or more process variables to maintain said temperature of said ion transport membrane within said desired temperature range;

g) balancing exothermic heat generated by reaction on the anode side by inducing within the reactor at least one of: latent heat of vaporization of an injected liquid stream; an endothermic reaction; and a temperature rise in at least one fluid stream; and h) determining the temperature of said oxygen selective ion transport membrane through direct measurement or through estimation based on at least one measured variable instead of direct measurement of the membrane temperature, and providing said determined temperature to a controller.

* * * * *